(12) United States Patent
Bao et al.

(10) Patent No.: US 8,977,606 B2
(45) Date of Patent: Mar. 10, 2015

(54) METHOD AND APPARATUS FOR GENERATING EXTENDED PAGE SNIPPET OF SEARCH RESULT

(71) Applicant: International Business Machines Corporation, Armonk, NY (US)

(72) Inventors: Sheng Hua Bao, Beijing (CN); Jian Chen, Beijing (CN); Zhong Su, Beijing (CN); Xin Ying Yang, Beijing (CN); Xiang Zhou, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 57 days.

(21) Appl. No.: 13/628,077

(22) Filed: Sep. 27, 2012

(65) Prior Publication Data

US 2013/0086035 A1    Apr. 4, 2013

(30) Foreign Application Priority Data

Sep. 30, 2011    (CN) .......................... 2011 1 0294672

(51) Int. Cl.
*G06F 7/76* (2006.01)
*G06F 17/30* (2006.01)

(52) U.S. Cl.
CPC .... *G06F 17/30864* (2013.01); *G06F 17/30696* (2013.01); *G06F 17/30554* (2013.01)
USPC ............ 707/706; 707/709; 707/722; 707/726

(58) Field of Classification Search
CPC .................... G06F 17/30864; G06F 17/30554; G06F 17/30696
See application file for complete search history.

(56) References Cited

U.S. PATENT DOCUMENTS

| | | | |
|---|---|---|---|
| 7,617,176 B2 | 11/2009 | Zeng et al. | |
| 7,725,813 B2* | 5/2010 | Sylthe et al. | 715/212 |
| 7,836,009 B2 | 11/2010 | Paczkowski et al. | |
| 7,900,181 B2 | 3/2011 | Hekmatpour et al. | |
| 8,533,761 B1* | 9/2013 | Sahami et al. | 725/53 |
| 2009/0024574 A1* | 1/2009 | Timmons | 707/3 |
| 2010/0228744 A1 | 9/2010 | Craswell et al. | |
| 2011/0153577 A1 | 6/2011 | Dean et al. | |

OTHER PUBLICATIONS

"New snippets for list pages," Krishnan, Raj, Inside Search the Official Google Search Blog, article dated Aug. 26, 2011, retrieved from http://insidesearch.blogspot.com/2011/08/new-snippets-for-list-pages.html on May 9, 2014.*
Turpin, Andrew et al., Fast Generation of Result Snippets in Web Search, SIGIR '07 Proceedings of the 30th annual international ACM SIGIR conference, 2007, pp. 127-134.

* cited by examiner

*Primary Examiner* — Bruce Moser
(74) *Attorney, Agent, or Firm* — Jeff Tang (57) ABSTRACT

A method and apparatus for generating an extended page snippet in a search engine. The method includes: retrieving and returning an associated table webpage having a table related to an inquired keyword; obtaining a parsed result of the table in the associated table webpage, and extracting column names and respective row instances on the basis of the parsed result; determining the row instances related to the inquired keyword; and generating a page snippet in a table style in accordance with the column names and the relative row instances. The page snippet in the table style can be generated by using a solution of the present invention.

20 Claims, 5 Drawing Sheets

---

Page 1

The Webpage is an explanation for Table 1

Table 1 is about...

The content of the Table is shown below

| HeaderA | HeaderB | HeaderC | HeaderD | HeaderE | HeaderF |
|---|---|---|---|---|---|
| a1 | b1 | c1 | d1 | e1 | f1 |
| a2 | b2 | c2 | d2 | e2 | f2 |
| a3 | b3 | c3 | d3 | e3 | f3 |
| a4 | b4 | c4 | d4 | e4 | f4 |
| a5 | b5 | c5 | d5 | e5 | f5 |
| a6 | b6 | c6 | d6 | e6 | f6 |
| a7 | b7 | c7 | d7 | e7 | f7 |
| a8 | b8 | c8 | d8 | e8 | f8 |
| a9 | b9 | c9 | d9 | e9 | f9 |
| a10 | b10 | c10 | d10 | e10 | f10 |
| a11 | b11 | c11 | d11 | e11 | f11 |
| a12 | b12 | c12 | d12 | e12 | f12 |
| a13 | b13 | c13 | d13 | e13 | f13 |
| a14 | b14 | c14 | d14 | e14 | f14 |
| a15 | b15 | c15 | d15 | e15 | f15 |

Page 1

The Webpage is an explanation for Table 1

Table 1 is about ...

The content of the Table is shown below

| HeaderA | HeaderB | HeaderC | HeaderD | HeaderE | HeaderF |
|---------|---------|---------|---------|---------|---------|
| a1 | b1 | c1 | d1 | e1 | f1 |
| a2 | b2 | c2 | d2 | e2 | f2 |
| a3 | b3 | c3 | d3 | e3 | f3 |
| a4 | b4 | c4 | d4 | e4 | f4 |
| a5 | b5 | c5 | d5 | e5 | f5 |
| a6 | b6 | c6 | d6 | e6 | f6 |
| a7 | b7 | c7 | d7 | e7 | f7 |
| a8 | b8 | c8 | d8 | e8 | f8 |
| a9 | b9 | c9 | d9 | e9 | f9 |
| a10 | b10 | c10 | d10 | e10 | f10 |
| a11 | b11 | c11 | d11 | e11 | f11 |
| a12 | b12 | c12 | d12 | e12 | f12 |
| a13 | b13 | c13 | d13 | e13 | f13 |
| a14 | b14 | c14 | d14 | e14 | f14 |
| a15 | b15 | c15 | d15 | e15 | f15 |

Figure 4

Page 2

The page is an explanation for Table 2

Table 2 is about...

The content of the table is shown below

| HeaderA | HeaderG | HeaderH | HeaderI |
|---------|---------|---------|---------|
| a1 | g1 | h1 | i1 |
| a2 | g2 | h2 | i2 |
| a3 | g3 | h3 | i3 |
| a4 | g4 | h4 | i4 |
| a5 | g5 | h5 | i5 |
| a6 | g6 | h6 | i6 |
| a7 | g7 | h7 | i7 |
| a8 | g8 | h8 | i8 |
| a9 | g9 | h9 | i9 |
| a10 | g10 | h10 | i10 |
| a11 | g11 | h11 | i11 |
| a12 | g12 | h12 | i12 |
| a13 | g13 | h13 | i13 |
| a14 | g14 | h14 | i14 |
| a15 | g15 | h15 | i15 |

Figure 5

Page 3

The webpage is an explanation for Table 3

Table 3 is about...

The content of the table is shown below

| HeaderB | HeaderC | HeaderD | HeaderE | HeaderJ |
|---------|---------|---------|---------|---------|
| b1  | c1  | d1  | e1  | j1  |
| b2  | c2  | d2  | e2  | j2  |
| b3  | c3  | d3  | e3  | j3  |
| b4  | c4  | d4  | e4  | j4  |
| b5  | c5  | d5  | e5  | j5  |
| b6  | c6  | d6  | e6  | j6  |
| b7  | c7  | d7  | e7  | j7  |
| b8  | c8  | d8  | e8  | j8  |
| b9  | c9  | d9  | e9  | j9  |
| b10 | c10 | d10 | e10 | j10 |
| b11 | c11 | d11 | e11 | j11 |
| b12 | c12 | d12 | e12 | j12 |
| b13 | c13 | d13 | e13 | j13 |
| b14 | c14 | d14 | e14 | j14 |
| b15 | c15 | d15 | e15 | j15 |

Figure 6

METHOD AND APPARATUS FOR GENERATING EXTENDED PAGE SNIPPET OF SEARCH RESULT

CROSS REFERENCE TO RELATED APPLICATION

This application claims priority under 35 U.S.C. 119 from Chinese Application 201110294672.4, filed Sep. 30, 2011, the entire contents of which are incorporated herein by reference.

BACKGROUND OF THE INVENTION

1. Field of the Invention

The invention relates generally to the technical field of generating an extended page snippet of a search result in a search engine, and particularly to a method and apparatus for generating a page snippet in table style.

2. Description of the Related Art

As the Internet business continuously grows, various existing search engines have become indispensable tools that people use to find network resources of interest, for example webpages.

Generally, a search engine operates in the following manner: once a user submits an inquiry though a client, the search engine will return searched webpages to the user through a search result page. One important object of the search engine is to provide a link set desired by the user with respect to a specific search inquiry of the user, and another object is that it is required to inform the user of the content associated with each link clearly and quickly. Therefore, when the search result is returned, besides a title and a uniform resource locator (URL) of the webpage, the search result page also contains a short text description related to the webpage. This short text description is usually referred to as page snippet. In general, the search engine extracts the page snippet from the webpage by extracting and combining text segments including a keyword involved in the inquiry. In the search result page, the search engine differentiates the display of the inquired keyword from other texts in the page snippet by various means, such as highlighting, underlining, different font, and the like, in order to draw the user's attention and facilitate the user to determine whether to click the webpage. The page snippet in the prior art reflects a correlation between the webpage and the inquiry to a certain extent. The current page snippet in the prior art consists of the text segments containing the inquired keyword, however, and selecting of the text segment does not take account of the content other than the keyword in the text segment. It also does not take account of the table format information of the text segment.

However, a table is an important data source, and some widely used data types adapted to be presented in a table are listed as follows: traditional Web Table type of data, for example, information such as members, companies, situations, merchandise, movies, and music, including both bordered tables and non-bordered tables. The application of business intelligence (BI) causes a number of enterprise data to be generated in the form of report form (a format such as Web report form, PDF, Excel®, Word and the like), and many BI analysis and presentation tools in an enterprise level such as IBM Cognos® and the like will generate a lot of report forms and publish the same. There is a strong search demand for such massive data in an enterprise or the Internet. Moreover, on the basis of a file parsing tool, various mainstream search engines have already brought documents in Excel, Word and the like under the retrieval.

In order to improve the user experience, the prior art also provides a search result preview function which may preview webpage information in the manner of a picture. In the field of increasingly mature search engine technology, the space for modifying is getting smaller and smaller, and difficulty in improvement and innovation to the search engine is increasing. Therefore, a little modification may mean a great improvement to the user experience. However, the snippet is different from the preview. The preview does not generate a relative segment for a final user's fast understanding on the basis of the inquiry, but simply outputs the content of the original webpage. Whereas the snippet is used for the user to quickly judge the correlation with the inquired word, the preview is used to further judge the correlation after the judgment through the snippet; the stages of using them are different. A display space of the snippet is very narrow and small, while the display space of the preview is very large. The snippet is displayed as default, but the preview is not and is displayed only after a mouse is moved to a particular position (including a title, a snippet, a network address and the like) to trigger the display, and there is also a delay in showing the display (depending on the displayed content and the network speed). Thus, the snippet and the preview are absolutely different technical solutions for those skilled in the art.

Accordingly, with respect to the table data source, the table format information thereof is also an extremely important part which facilitates the user to quickly understand the search result through the webpage snippet. The search technology needs to be further improved to at least present the table format formation in the page snippet to a certain extent.

BRIEF SUMMARY OF THE INVENTION

In order to overcome these deficiencies, the present invention provides a method for generating an extended page snippet in a search engine, comprising: retrieving and returning an associated table webpage having a table related to an inquired keyword; obtaining a parsed result of the table in said associated table webpage, and extracting column names and respective row instances based on said parsed result; determining relative row instances related to said inquired keyword; and generating a page snippet in a table style in accordance with said column names and said relative row instances.

According to another aspect, the present invention provides an apparatus for generating an extended page snippet in a search engine, comprising: means for retrieving and returning an associated table webpage having a table related to an inquired keyword; means for obtaining a parsed result of the table in said associated table webpage, and extracting column names and respective row instances based on said parsed result; means for determining the relative row instances related to said inquired keyword; means for generating a page snippet in a table style in accordance with said column names and said relative row instances.

BRIEF DESCRIPTION OF THE SEVERAL VIEWS OF THE DRAWINGS

The inventive features regarded as the character of the present invention is stated in the appended claims. However, the present invention and the preferable usage modes, objects, features and advantages thereof can be better understood by reading detailed description of explanatory embodiments below with reference to the appended drawings, wherein:

DETAILED DESCRIPTION OF THE PREFERRED EMBODIMENTS

Those skilled in the art know the present invention can be embodied as a system, a method or a computer program product. Accordingly, the present invention can be embodied in any one of the following forms, including: an absolute hardware, an absolute software (including a firmware, a resident software, a microcode, etc.), or a combination of a software part and a hardware part referred to as a "circuit," a "module," or a "system" in this document. In addition, the present invention may also take a form of computer program product embodied in any tangible medium of expression having computer usable non-transient program codes.

Any combination of one or more computer readable medium(s) can be used. The computer readable medium can be a computer readable signal medium or a computer readable storage medium. For example, the computer readable storage medium can include, but is not limited to, an electric, magnetic, optical, electromagnetic, infrared or semi-conductive system, apparatus, device or propagation medium, or any appropriate combination thereof. More specific examples (a non-exhaustive list) of the computer readable storage medium include the following: an electrical connection with one or more wires, a portable computer disk, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any appropriate combination thereof. In the context of this document, the computer readable storage medium can be any tangible medium containing or storing a program for use by or in connection with an instruction executing system, apparatus or device.

The computer readable signal medium can include, for example, a data signal propagated in a base band or as part of a carrier wave, which carries the computer readable program codes. Such a propagated signal can adopt any appropriate form including, but not limited to, an electromagnetic signal, an optical signal or any appropriate combination thereof. The computer readable signal medium can be any computer readable medium other than a computer readable storage medium, which is capable of transmitting, propagating or transporting the program for use by or in connection with an instruction executing system, apparatus or device.

The non-transient program codes contained on the computer readable medium can be transmitted with any appropriate medium including, but not limited to, a wireless medium, a wire, an optical fiber cable, an RF or the like, or any appropriate combination thereof.

Computer non-transient program code for carrying out operations of the present invention can be written in any combination of one or more programming languages, including an object oriented programming language such as Java, Smalltalk, C++ or the like and conventional procedural programming languages, such as the "C" programming language or similar programming languages. The non-transient program code can execute entirely on a user's computer, partly on a user's computer, as a stand-alone software package, partly on a user's computer and partly on a remote computer or entirely on a remote computer or server. In the latter scenario, the remote computer can be connected to the user's computer through any type of network, including a local area network (LAN), or a wide area network (WAN), or the connection can be made to an external computer (for example, through the Internet using an Internet Service Provider).

The present invention is described below with reference to the flowcharts and/or block diagrams of the method, apparatus (system) and computer program product according to the embodiments of the present invention. It is understood that each block of the flowcharts and/or block diagrams and combinations of blocks in the flowcharts and/or block diagrams, can be both implemented by computer program instructions. These computer program instructions can be provided to a processor of a general purpose computer, special purpose computer, or other programmable data processing apparatus, thereby producing a machine, such that the instructions, which are executed by the computer or the other programmable data processing apparatus, create means for implementing the functions and operations specified in the block or blocks in the flowcharts and/or block diagrams.

These computer program instructions may also be stored in a computer-readable medium that can direct a computer or other programmable data processing apparatus to function in a particular manner, such that the instructions stored in the computer-readable medium produce an article of manufacture including instruction means implementing the functions and operations specified in the block or blocks in the flowcharts and/or block diagrams.

The computer program instructions may also be loaded onto a computer or other programmable data processing apparatus to cause a series of operation steps to be performed on the computer or other programmable data processing apparatus to generate a computer implemented process such that the instructions which execute on the computer or other programmable data processing apparatus provide processes for implementing the functions and operations specified in the block or blocks in the flowcharts and/or block diagrams.

Figure 1:
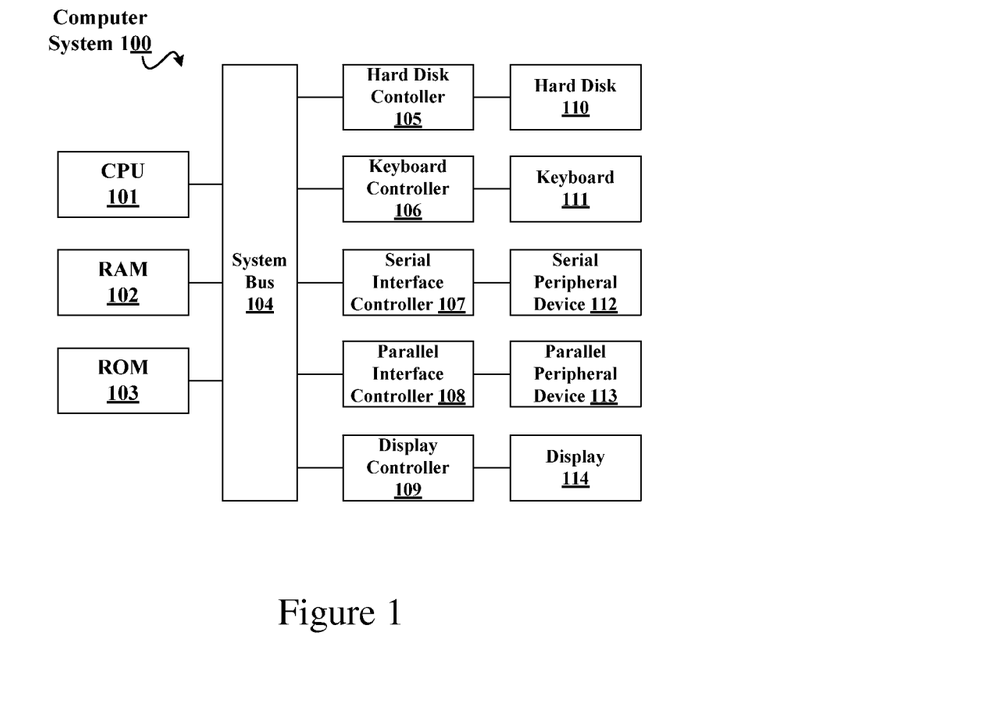
FIG. 1 shows an exemplary computer system for implementing an embodiment of the present invention.

Now referring to FIG. 1, it shows a block diagram of an exemplary computer system 100 adapted to implement an embodiment of the present invention. As shown, the computer system 100 can include a CPU (Central Processing Unit) 101, a RAM (Random Access Memory) 102, a ROM (Read Only Memory) 103, a system bus 104, a hard disk controller 105, a keyboard controller 106, a serial interface controller 107, a parallel interface controller 108, a display controller 109, a hard disk 110, a keyboard 111, a serial peripheral device 112, a parallel peripheral device 113, and a display 114. In these devices, there are the CPU 101, the RAM 102, the ROM 103, the hard disk controller 105, the keyboard controller 106, the serial interface controller 107, the parallel interface controller 108 and the display controller 109 coupled with the system bus 104. The hard disk 110 is coupled with the hard disk controller 105, the keyboard 111 is coupled with the keyboard controller 106, the serial peripheral device 112 is coupled with the serial interface controller 107, the parallel peripheral device 113 is coupled with the parallel interface controller 108, and the display 114 is coupled with the display controller 109. It should be understood that the structure block diagram illustrated in FIG. 1 is shown for the purpose of an example only and not as a limitation to the scope of the present invention. In some cases, some devices can be added or removed depending on a specific situation.

Figure 2:
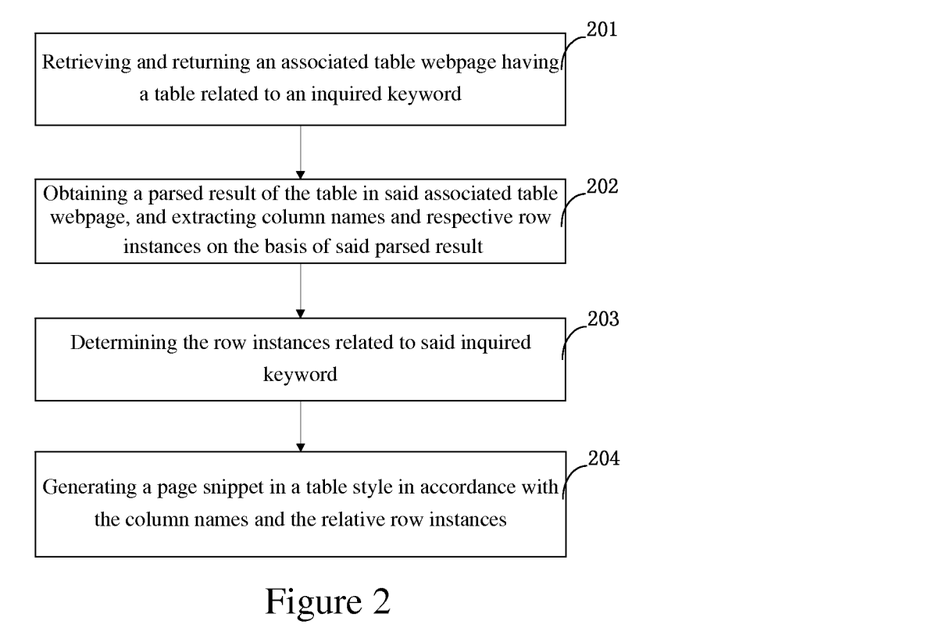
FIG. 2 shows a method flowchart for generating an extended snippet of a search result of the present application.

Referring to FIG. 2, it shows a method flowchart for generating an extended snippet of a search result in one embodiment, including the steps as follows:

Step 201, retrieving and returning an associated table webpage having a table related to an inquired keyword.

In one embodiment, a webpage series related to the inquired keyword can be retrieved and returned, and the webpage series includes at least one associated table webpage having a table related to the inquired keyword. The inquired keyword can include one or more keywords, the number of which depends on the user's input. The webpage series related to the inquiry can be determined with a technology in the existing search engines. In the associated table webpage, the table related to the inquired keyword means matching part or all of the keywords in the inquired keywords in the table.

Generally, a table consists of three parts, i.e. rows, columns and cells, in which the cell in the first row are table header information, contents of the respective cells in the first row are column names of the respective columns, and data in cells of each row in the table are a row instance. The table usually adopts the formats of HTML, Excel, Word, PDF, and so on.

Step 202, obtaining a parsed result of the table in the associated table webpage, and extracting the column names and the respective row instances therefrom.

The existing search engines can be classified into two types according to the search result source. One type possesses its own webpage snatching, indexing and retrieving system (Indexer), has an independent "Spider" program, or a "Crawler" program, or a "Robot" program (the three titles having the same meaning), and can build a webpage database itself, and the search result is called directly from its own database. The second type rents a database of another search engine and sorts the search results in its self-defined format.

Accordingly, the parsed result of the table can also be obtained by a variety of ways. In an embodiment using the first type of search engine as a background, before the retrieving step 201, tables in all webpages are parsed when the spider program is used to snatch the webpages. The parsed result is stored in a self-built webpage database, and then the parsed result of the table is returned when the webpage series is returned in step 201. For an embodiment using the second type of search engines as the background, however, a real time manner can be employed to parse the tables in the associated table webpage, thereby obtaining the parsed result.

In the prior art, a variety of parsers are provided for parsing tables in diverse formats:

Therein, the Poor Obfuscation Implementation (POI) of the Apache is a function library with open source codes of the Apache software foundation. It provides an API for a Java program such that the Java program has the function of writing and reading Microsoft office format files. The Apache POI is also open source code software used in many search software and can be used to parse tables in various Office formats in the webpages. For example, for a table in a Word format, the table in the Word format can be read and parsed through the classes of Table, TableCell, TableRow, TableIterator, and the like in the POI, specifically exemplified as follows:

```
    TableIterator it = new TableIterator(range);   // iterating all tables
in the document
            while (it.hasNext( )) {
                    Table tb = (Table) it.next( ); // iterating rows ,
starting from 0 as default
                    for (int i = 0; i < tb.numRows( ); i++) {
                        TableRow tr = tb.getRow(i);  // iterating
```

-continued

```
columns , starting from 0 as default
                    for (int j = 0; j < tr.numCells( ); j++) {
                        TableCell td = tr.getCell(j);// obtaining cells
                        // obtaining contents of the cells
                        for(int k=0;k<td.numParagraphs( );k++){
                            Paragraph para =td.getParagraph(k);
                            String s = para.text( );
                            System.out.println(s);
                        }
                    }
            }
    }
```

For a table in an Excel format, the content of the Excel table can be parsed through elements of HSSFWorkbook, HSSFSheet, HSSFRow, HSSFCell and the like in the POI, specifically exemplified as follows:

```
    workbook = new HSSFWorkbook(is);   // if it is an Excel file, then
the HSSFWorkbook read is created
    numOfSheets = workbook.getNumberOfSheets( );       // setting a
Sheet number
    HSSFSheet sheet = workbook.getSheetAt(currSheet);  // obtaining a
current sheet
    int currPosition = 0;   // setting a current row position to zero
    int row = currPosition;
    HSSFRow rowline = sheet.getRow(row);
    int filledColumns = rowline.getLastCellNum( );// obtaining a column
number of the current row
    HSSFCell cell = null;
    for (int i = 0; i < filledColumns; i++) {   // circularly traversing all
    the columns
            cell = rowline.getCell((short) i);   // obtaining a current Cell
    }
```

There also exists a parser for an HTML webpage (HTML Parser) in the prior art (sourceforge, http://htmlparser.sourceforge.net), which is mainly used to modify or extract the HTML, provide an interface, and support a linear and nesting HTML text.

Extracting the column names and the instances in the parsed result of the table also includes a variety of embodiments: in one embodiment, column name information can be extracted according to a column name tag, and instance information can be extracted according to an instance tag. For example, after an HTML table is parsed, a relation of column names is extracted by a <TH> tag, and the instance information of the respective columns are extracted by a <TD> tag. In another embodiment, for example, for a table obtained by the POI, it is possible that there is no explicit tag bit representing the column name. In this case, a first non-null row in the table can be verified. Since a data format of the table header is generally different from the data format of the contents of the respective rows in the table, if the element format of the row is obviously distinguished from all the rest of the rows, then that row can be used as the column name row.

Step 203, determining a row instance related to the inquired keyword.

According to a position of the inquired keyword in the table, covered rows are determined, the column name is selected, and the instance rows are selected. For the snippet, the display space is limited, and only a limited number of rows can be displayed. Thus, selection of the relative instance rows is very important. In contrast, since the width requirement of the snippet is not strict, as long as the snippet does not exceed the width of the display screen, the covered column names can be all displayed basically.

As an option, weight information of the inquired keyword can also be taken into account, thereby assisting selection of relative instances and relative column names. The weight information can also be used to adjust the displayed content and order of the instances and the column names so that the most relative instance is displayed in front. The inquired word weight is one factor that needs to be considered when an adjustment to the snippet display order is made, and is usually the information provided by the search engine provider according to the statistics. As an example, different weights can be assigned according to a frequency that the inquired keyword is searched.

Step 204, generating the page snippet in a table style in accordance with the column names and the relative row instances.

In one embodiment, if a plurality of inquired keywords appear in step 201, then the step can include: statistically calculating the weights of the inquired keywords in the relative row instances to obtain the correlation of the row instances; and generating the page snippet in the table style in accordance with the column names and at least one relative row instance with the correlation arranged in the top. In the snippet, the selected row instances can be presented according to an original order in the table, or the relative row instances and the corresponding column names can be presented from highest to lowest correlation. Further, the form of the table in the page snippet in the table style can display either a border or no border, but it is at least necessary that the column names in the table correspond to the position of the instances with each other.

Now a flow for generating the snippet in the table style crossing pages is further explained in conjunction with FIG. 2, and a plurality of associated table webpages are returned in step 201 shown in FIG. 2. As an optional step, in one embodiment, pages having a similarity are aggregated by webpage clustering in accordance with the inquired keyword and the webpage series returned by the search engine. In this embodiment, the plurality of associated table webpages are all in the same cluster. The webpage clustering can adopt well known technical means which will not be stated in more detail herein. In one embodiment, the webpages from the same website domain name in the webpage series are clustered and the plurality of associated table webpages are included in the clustered result. The webpage aggregation is performed on webpages from the same website because tables having a high correlation usually occur in webpages under the same website domain name. Thus the correlation of the aggregation can be increased. For instance, in the information published in a company website, the information of one employee can be published with a plurality different tables for the same employee. Thus the webpages on which the snippet crossing pages can be performed are found more exactly by aggregating the webpages belonging to the website of the company.

Furthermore, the page snippet in the table style crossing pages can be generated in the following two embodiments. The page snippet in the table style crossing pages combines the column names and the instances associated with the inquired keyword in the plurality of associated table webpages.

In the first embodiment, after the plurality of associated table webpages are returned in step 201 shown in FIG. 2, the snippets in the table style are generated for each of the associated table webpages through step 202 to step 204. This embodiment includes: combining the snippet in the table style of the plurality of associated table webpages to obtain a combined snippet; determining the relative row instances and the column names in the combined snippet in accordance with the inquired keyword; and outputting the page snippet in the table style crossing pages in accordance with the relative row instances and the column names. Referring to Table 1, this embodiment is explained. The snippets in the table style of pages P1 and P3 shown in Table 1 match all inquired keywords KEY1, KEY2 and KEY3, and the snippet in the table style of page P2 matches part of the inquired keywords KEY1.

TABLE 1

| P1 | | | | |
|---|---|---|---|---|
| T1 | T4 | T2 | T5 | T3 |
| KEY1 | | KEY2 | | KEY3 |
| P2 | | | | |
| T1 | T6 | T7 | T8 | |
| KEY1 | | | | |
| P3 | | | | |
| T1 | T2 | T3 | T5 | T9 |
| KEY1 | KEY2 | KEY3 | | |

After the snippets in the table style of the plurality of pages are combined, the combined snippet in the table style is generated. A blend and a concatenation of the column names and the instances occur in the combination of the snippets in the table style, that is, the parts with the same column name and cell data are blended, and the parts with the different column names and cell data are concatenated. As shown in Table 2, the combined snippet in the table style is illustrated.

TABLE 2

| T1 | T2 | T3 | T5 | T4 | T9 | T6 | T7 | T8 |
|---|---|---|---|---|---|---|---|---|
| KEY1 | KEY2 | KEY2 | | | | | | |

New relative instances and new relative column names are selected in the combined snippet in the table style according to the inquired keyword. After a plurality of snippets in the table style are blended, the size thereof may no longer be adapted to be displayed as the snippet, so it is necessary to further select the relative instances and the relative column names. Moreover, a final snippet in the table style is outputted according to the new relative instances and the new relative column names, and the inquiry result including the webpage series and the page snippet is generated.

In another embodiment, after the parsed results of the tables in the associated table webpages are obtained, the parsed results of the tables of the plurality of associated table webpages are combined to obtain a combined parsed result of the table. The row instances and the column names are extracted from the combined parsed result of the table. Thereafter, the page snippet in the table style crossing pages is generated through step 202 to step 204. The parsed results of the plurality of associated table webpages are combined as the new parsed result, then the instances and the column names related to the inquired keyword are further selected, so the instance is selected only once.

Figure 3:
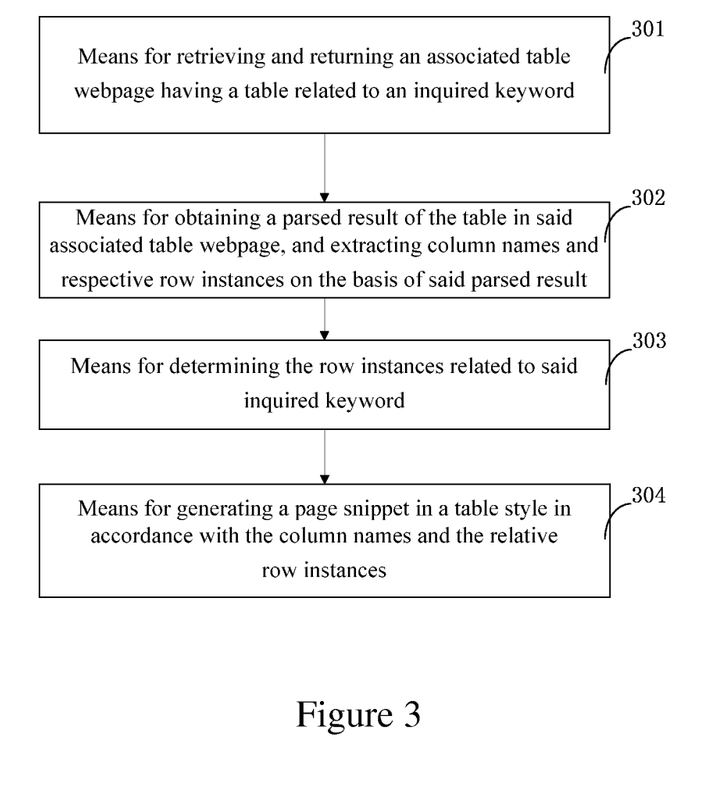
FIG. 3 shows a schematic diagram of an apparatus for generating an extended snippet of a search result of the present application.

By implementing the method flow disclosed above in FIG. 2 in the computer system shown in FIG. 1, the present application is also embodied as an apparatus for generating a page snippet in a table style in a search engine. FIG. 3 shows an architecture schematic diagram of the apparatus, mainly including: a means 301 for retrieving and returning an associated table webpage having a table related to an inquired keyword; a means 302 for obtaining a parsed result of the table in the associated table webpage, and extracting column names and respective row instances on the basis of the parsed result; a means 303 for determining the row instances related to the inquired keyword; and a means 304 for generating a page snippet in a table style in accordance with the column names and the relative row instances.

In an embodiment, the means for retrieving and returning an associated table webpage having a table related to an inquired keyword returns a plurality of associated table webpages.

Further, in an embodiment, the means for obtaining a parsed result of the table in the associated table webpage and extracting column names and respective row instances on the basis of the parsed result includes: a means for combining the parsed results of the tables of the plurality of associated table webpages to obtain a combined parsed result of the table after the parsed results of the tables in the associated table webpages are obtained; and extracting the column names and the respective row instances on the basis of the combined parsed result of the table, wherein the means for generating the page snippet in the table style in accordance with the column names and the relative row instances generates the page snippet in the table style crossing pages.

In an embodiment, further included are: means for combining the page snippets in the table style of the plurality of associated table webpages; means for determining the row instances related to the inquired keyword in the combined page snippet in the table style; and means for generating the page snippet in the table style crossing pages in accordance with the column names and the relative row instances.

In another embodiment, the means for retrieving and returning an associated table webpage having a table related to an inquired keyword clusters the webpages from the same website domain name, and determines the plurality of associated table webpages in the clustering.

In an embodiment, the column names and the instances from different webpages are visually distinguished in the page snippet in the table style crossing pages.

In an embodiment, the inquired keywords are plural in the means for retrieving and returning, and the means for generating the page snippet in the table style in accordance with the column names and the relative row instances include: a means for statistically calculating weights of the inquired keywords in the relative row instances to obtain correlations of the row instances; and a means for generating the page snippet in the table style in accordance with said column names and at least one relative row instance with the correlation arranged in the top.

In an embodiment, the parsed result of the table is a result which is obtained and stored by parsing the tables in all webpages when a spider program snatches the webpages.

In an embodiment, the parsed result of the table is obtained by parsing the table in the associated table webpage in real time.

With the foresaid solutions, the inquiry is understood on the basis of parsing the table information in documents in various formats. Further, the page snippet in the table style reserving the table format information is generated. Therefore, the deficiency is improved that only the keyword in the search result is extracted and no table format information is reserved in the prior art.

Next, the technical solution of the present application is exemplarily explained in one complete embodiment for a webpage. It is assumed that the inquired keywords are a2, b2, and b9, and Page1 is a webpage in the returned webpage series. The page 1 (Page1) shown in FIG. 4 includes a table related to the inquired keywords.

Figure 4:
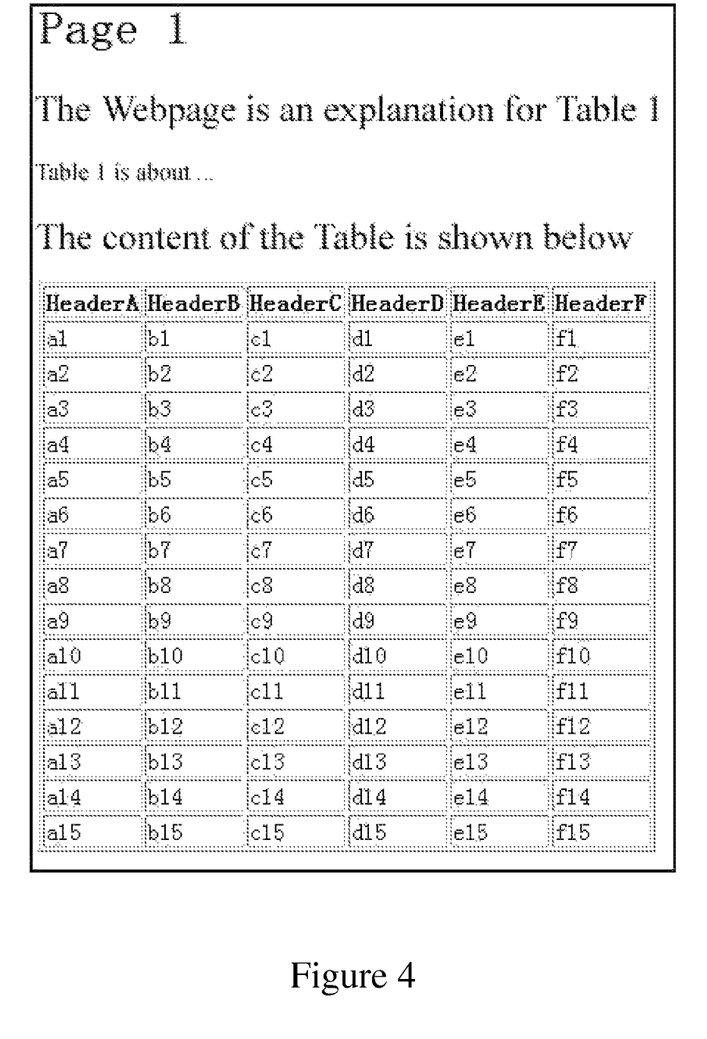
FIG. 4 shows a schematic diagram of webpage 1 in an embodiment.

After being parsed by the HTML Parser, the result is:

```
[-] <html>
    [+] <head>
    [-] <body>
        <h1> Page 1 </h1>
        <h2> This page talks about table 1 </h2>
        <p> bla bla bla . . . </p>
        <h2> The content of the table is shown as below </h2>
        [-] <table border="1">
            [-] <tbody>
                [-] <tr>
                    <th> HeaderA </th>
                    <th> HeaderB </th>
                    <th> HeaderC </th>
                    <th> HeaderD </th>
                    <th> HeaderE </th>
                    <th> HeaderF </th>
                </tr>
                [-] <tr>
                    <td> a1 </td>
                    <td> b1 </td>
                    <td> c1 </td>
                    <td> d1 </td>
                    <td> e1 </td>
                    <td> f1 </td>
                </tr>
                [-] <tr>
                    <td> a2 </td>
                    <td> b2 </td>
                    <td> c2 </td>
                    <td> d2 </td>
                    <td> e2 </td>
                    <td> f2 </td>
                </tr>
                [+] <tr>
                [+] <tr>
                [+] <tr>
                [+] <tr>
                [+] <tr>
                [+] <tr>
                [+] <tr>
```

The position of the table is located and acquired by the <Table> tag from the above parsed structure, and the information of the column names are extracted by the <TH> tag as follows:

```
[-] <tr>
    <th> HeaderA </th>
    <th> HeaderB </th>
    <th> HeaderC </th>
    <th> HeaderD </th>
    <th> HeaderE </th>
    <th>HeaderF </th>
</tr>
```

The information of the respective row instances are extracted by the <TD> tag at the same time, for example:

```
[-] <tr>
    <td> a1 </td>
    <td> b1 </td>
    <td> c1 </td>
    <td> d1 </td>
    <td> e1 </td>
    <td> f1 </td>
</tr>
[-] <tr>
```

```
            <td> a2 </td>
            <td> b2 </td>
            <td> c2 </td>
            <td> d2 </td>
            <td> e2 </td>
            <td> f2 </td>
         </tr>
      [+] <tr>
      [+] <tr>
      [+] <tr>
      [+] <tr>
      [+] <tr>
      [+] <tr>
```

It can be determined that the instances of the second row and the ninth row meet the match by matching the keywords a2, b2 and b9. If it is assumed that each keyword is equally important, it can follow that the correlation of the second row is ⅔, and the correlation of the ninth row is ⅓. Meanwhile, it can be determined that the second row covers columns a and b, and the ninth row covers column b. Accordingly, it can be determined that the second row instance and the ninth row instance are relative instances, and HeaderA and HeaderB are relative column names. Referring to Table 3, it is a schematic of the final generated snippet in the table style.

TABLE 3

| HeaderA | HeaderB | HeaderC | HeaderD | HeaderE | HeaderF |
|---------|---------|---------|---------|---------|---------|
| a2      | b2      | c2      | d2      | e2      | f2      |
| a9      | b9      | c9      | d9      | e9      | f9      |

If the column space is constrained, in one embodiment, the part of unrelated table columns in the last can be omitted. See Table 4 for the exemplary snippet in the table style.

TABLE 4

| HeaderA | HeaderB | HeaderC | HeaderD |
|---------|---------|---------|---------|
| a2      | b2      | c2      | d2      |
| a9      | b9      | c9      | d9      |

Next, an example of generating the snippet crossing pages is provided.

Figure 5:
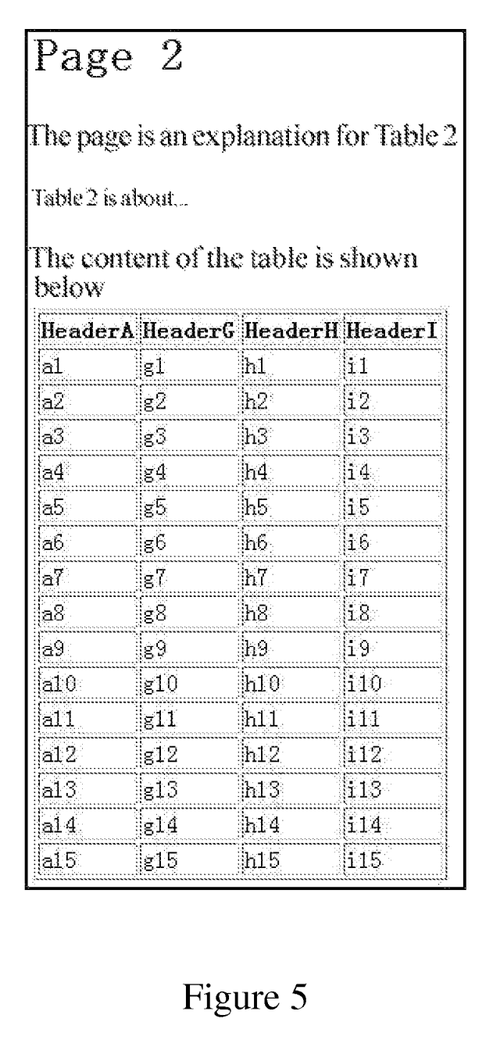
FIG. 5 shows a schematic diagram of webpage 2 in an embodiment.
Figure 6:
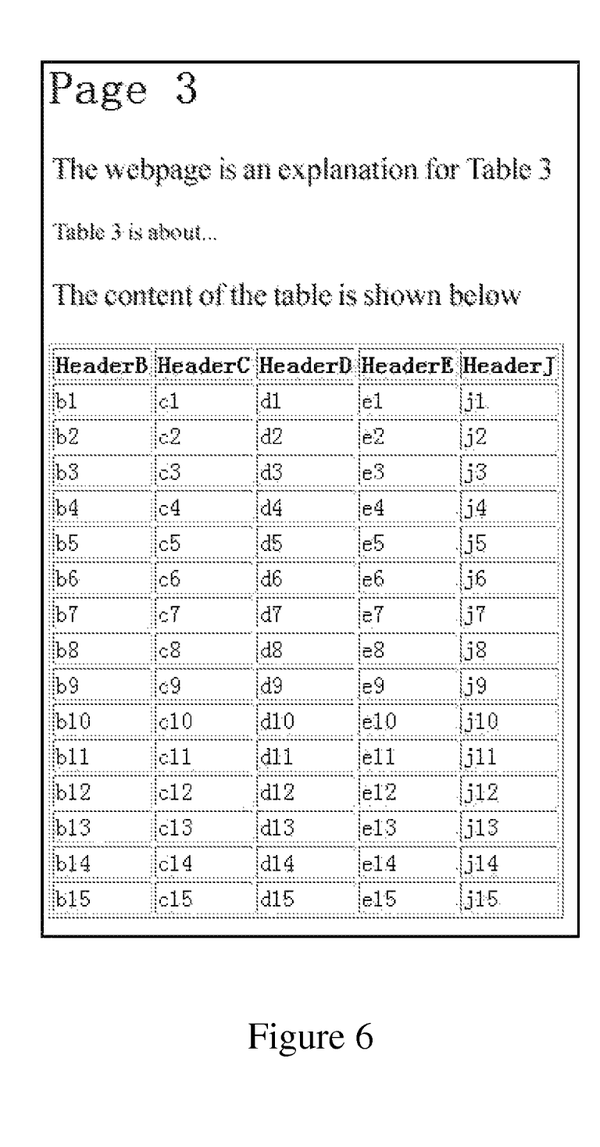
FIG. 6 shows a schematic diagram of webpage 3 in an embodiment.

FIGS. 5 and 6 show webpage 2 (Page2) and webpage 3 (Page3) including the following table information in the same website, respectively. It is assumed that the inquired keywords are a2, b2, b9, h2 and j9, and it can be determined that the webpage 1 has the table matching with a part of keywords a2, b2 and b9, the webpage 2 has the table matching with a part of keywords a2 and h2, and the webpage 3 has the table matching with a part of keywords b2, b9 and j9. Any one of the pages can not satisfy the requirement of matching all keywords in the required keywords. Referring to Table 5, the snippet in the table style crossing pages obtained by the method provided by the present application is shown exemplarily.

TABLE 5

| HeaderA | HeaderB | HeaderC | HeaderD | HeaderE | HeaderF | HeaderG | HeaderH | HeaderI | HeaderJ |
|---------|---------|---------|---------|---------|---------|---------|---------|---------|---------|
| a2      | b2      | c2      | d2      | e2      | f2      | g2      | h2      | i2      | j2      |
| a9      | b9      | c9      | d9      | e9      | f9      | g9      | h9      | i9      | j9      |

If the column space is also constrained, referring to Table 6, a schematic of omitting the part of unrelated table columns is shown.

TABLE 6

| HeaderA | HeaderB | HeaderC | HeaderH | HeaderI | HeaderJ |
|---------|---------|---------|---------|---------|---------|
| a2      | b2      | c2      | h2      | i2      | j2      |
| a9      | b9      | c9      | h9      | i9      | j9      |

In one embodiment, the parts from different webpages can be visually differentiated in the generated snippet in the table style with different format information, and the user can click the corresponding part and jump to the source webpage to browse the information.

It should be pointed out that, the above description is an example only, but does not limit the present invention. The flowcharts and block diagrams in the drawings illustrate the architecture, functionality and operation of possible implementations of systems, methods and computer program products according to various embodiments of the present invention. In this regard, each block in the flowcharts or block diagrams may represent a modular, program segment, or part of code, which includes one or more executable instructions for implementing the specified logic function(s). It should also be noted that, in some alternative implementations, the functions noted in the block can also occur in an order other than as noted in the drawings. For example, two blocks consecutively shown may, in fact, be performed substantially in parallel, or sometimes they can be performed in a reverse order, depending upon the functionality involved. It will also be noted that, each block of the block diagrams and/or flowcharts and combinations of blocks in the block diagrams and/or flowcharts, can be implemented by using a special purpose hardware-based system that executes the specified functions or operations, or by using a combination of a special purpose hardware and computer instructions.

What is claimed is:

1. A method for generating an extended page snippet in a search engine, comprising:
   retrieving and returning an associated table webpage having a table related to an inquired keyword;
   obtaining a parsed result of the table in said associated table webpage, and extracting column names and respective row instances based on said parsed result;
   determining relative row instances related to said inquired keyword;
   generating a page snippet in a table style in accordance with said column names and said relative row instances;
   wherein retrieving and returning an associated table webpage returns a plurality of associated table webpages;
   wherein obtaining a parsed result returns a plurality of parsed; and
   wherein obtaining a parsed result and extracting column names and respective row instances further comprises;

combing said plurality of parsed results to obtain a combined parsed result of the table;

extracting said column names and respective row instances based on said combined parsed result of the table; and generating said page snippet further generates said page snippet in the table style crossing pages.

2. The method according to claim 1, further comprising:

generating a plurality of page snippets;

combining said page snippets in the table style of said plurality of associated table webpages;

determining the row instances related to said inquired keyword in said combined page snippet in the table style; and generating said page snippet in the table style crossing pages in accordance with said column names and said relative row instances.

3. The method according to claim 2, wherein said column names and row instances from different webpages are visually distinguished in said page snippet in the table style crossing pages.

4. The method according to claim 1, wherein webpages from a same website domain name are clustered, and said plurality of associated table webpages are determined in said clustered result in said step of retrieving and returning.

5. The method according to claim 1, wherein said column names and row instances from different webpages are visually distinguished in said page snippet in the table style crossing pages.

6. The method according to claim 1, wherein said inquired keywords are plural in said step of retrieving and returning, and said step of generating said page snippet further comprises:

statistically calculating weights of said inquired keywords in said relative row instances to obtain a correlation of said row instances; and generating said page snippet in the table style in accordance with said column names and at least one relative row instance with said correlation arranged in the top.

7. The method according to claim 1, wherein obtaining said parsed result of said table comprises:

parsing said table in a webpage series by snatching said webpage series with a spider program, wherein said webpage series includes said associated table webpage, and storing said parsed result.

8. The method according to claim 1, wherein said parsed result of the table is obtained by parsing the table in said associated table webpage in real time.

9. An apparatus for generating an extended page snippet in a search engine, comprising:

a memory;

a processor communicatively coupled to the memory; and an extended page snippet generation module communicatively coupled to the memory and the processor, wherein the extended page snippet generation module is configured to perform the steps of a method comprising:

retrieving and returning an associated table webpage having a table related to an inquired keyword;

obtaining a parsed result of the table in said associated table webpage, and extracting column names and respective row instances based on said parsed result;

determining the relative row instances related to said inquired keyword; and generating a page snippet in a table style in accordance with said column names and said relative row instances;

wherein retrieving and returning an associated table webpage returns a plurality of associated table webpages;

wherein obtaining a parsed result returns a plurality results; and wherein obtaining a parsed result and extracting column names and respective row instances further comprises;

combing said plurality of parsed results to obtain a combined parsed result of said table;

extracting said column names and respective row instances based on said combined parsed result of the table; and generating said page snippet further generates said page snippet in the table style crossing pages.

10. The apparatus according to claim 9, wherein generating a page snippet generates a plurality of page snippets, the method further comprising:

combining said page snippets in the table style of said plurality of associated table webpages;

determining the row instances related to said inquired keyword in said combined page snippet in the table style; and generating said page snippet in the table style crossing pages in accordance with said column names and said relative row instances.

11. The apparatus according to claim 10, wherein said column names and said row instances from different webpages are visually distinguished in said page snippet in the table style crossing pages.

12. The apparatus according to claim 9, wherein retrieving and returning an associated table webpage clusters webpages from a same website domain name, and determines said plurality of associated table webpages in said clustering.

13. The apparatus according to claim 9, wherein said column names and said row instances from different webpages are visually distinguished in said page snippet in the table style crossing pages.

14. The apparatus according to claim 9, wherein said inquired keywords are plural in said retrieving and returning, and generating said page snippet further comprises:

statistically calculating weights of said inquired keywords in said relative row instances to obtain a correlation of said row instances; and generating said page snippet in the table style in accordance with said column names and at least one relative row instance with said correlation arranged in the top.

15. The apparatus according to claim 9, wherein obtaining said parsed result of said table comprises:

parsing said table in a webpage series by snatching said webpage series with a spider program, wherein said webpage series includes said associated table webpage, and storing said parsed results.

16. The apparatus according to claim 9, wherein said parsed result of the table is obtained by parsing said table in said associated table webpage in real time.

17. A non-transitory computer readable storage medium tangibly embodying a computer readable program code having computer readable instructions which, when implemented, cause a computer device to carry out the steps of a method for generating an extended page snippet in a search engine, the method comprising:

retrieving and returning an associated table webpage having a table related to an inquired keyword;

obtaining a parsed result of the table in said associated table webpage, and extracting column names and respective row instances based on said parsed result;

determining relative row instances related to said inquired keyword;

generating a page snippet in a table style in accordance with said column names and said relative row instances;

wherein retrieving and returning an associated table webpage returns a plurality of associated table webpages;

wherein obtaining a parsed result returns a plurality of parsed result; and wherein obtaining a parsed result and extracting column names and respective row instances further comprises;

combing said plurality of parsed results to obtain a combined parsed result of the table;

extracting said column names and respective row instance based on said combined parsed result of the table; and generating said page snippet further generates said page snippet in the table style crossing pages.

18. The computer readable storage medium according to claim 17, the method further comprising;

generating a plurality of page snippets:

combining said page snippets in the table style of said plurality of associated table webpages;

determining the row instances related to said inquired keyword in said combined page snippet in the table style; and generating said page snippet in the table style crossing pages in accordance with said column names and said relative row instances.

19. The computer readable storage medium according to claim 17, wherein webpages from a same website domain name are clustered, and said plurality of associated table webpages are determined in said clustered result in said step of retrieving and returning.

20. The computer readable storage medium according to claim 17, wherein said column names and row instances from different webpages are visually distinguished in said page snippet in the table style crossing pages.

* * * * *